US012671508B2

(12) United States Patent
Rydström et al.

(10) Patent No.: US 12,671,508 B2
(45) Date of Patent: Jun. 30, 2026

(54) DIGITAL TWIN AND A METHOD FOR MODELLING CONNECTIVITY OF A HEAVY-DUTY VEHICLE

(71) Applicant: VOLVO TRUCK CORPORATION, Gothenburg (SE)

(72) Inventors: Mats Rydström, Billdal (SE); Tommy Rosgardt, Lindome (SE); Ingmar Bengtsson, Lindome (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 508 days.

(21) Appl. No.: 18/172,514

(22) Filed: Feb. 22, 2023

(65) Prior Publication Data

US 2023/0327791 A1 Oct. 12, 2023

(30) Foreign Application Priority Data

Mar. 25, 2022 (EP) ..................................... 22164501

(51) Int. Cl.
*H04B 17/391* (2015.01)
(52) U.S. Cl.
CPC ................................ *H04B 17/3913* (2015.01)
(58) Field of Classification Search
CPC ..... H04W 4/029; G06N 10/20; H04B 17/391; G06F 30/27; G06V 20/188; G06T 17/05
See application file for complete search history.

(56) References Cited

U.S. PATENT DOCUMENTS

| 2020/0051440 A1 | 2/2020 | Yousif et al. | |
| 2021/0284448 A1 | 9/2021 | Lee | |
| 2023/0042433 A1* | 2/2023 | Singh | G07C 5/0808 |
| 2023/0085943 A1* | 3/2023 | Karri | G06Q 50/40 |
| | | | 703/8 |
| 2023/0327791 A1* | 10/2023 | Rydström | G06F 30/20 |
| | | | 370/252 |

FOREIGN PATENT DOCUMENTS

WO 2021001007 A1 1/2021

OTHER PUBLICATIONS

Extended European Search Report in corresponding European Application No. 22164501.3 dated Sep. 9, 2022 (8 pages).

* cited by examiner

*Primary Examiner* — Iqbal Zaidi
(74) *Attorney, Agent, or Firm* — Jeffri A. Kaminski; Venable LLP

(57) ABSTRACT

A method is performed by a digital twin for modelling connectivity of a heavy-duty vehicle. The digital twin comprises a digital model of the heavy-duty vehicle. The digital twin is configured to access another digital model of one or more communication networks in which the heavy-duty vehicle is expected to operate. The digital twin models an expected degree of connectivity of the heavy-duty vehicle to at least one of the one or more communication networks. The modelling is in dependence of at least one of: a vehicle state and vehicle connectivity system(s) onboard the heavy-duty vehicle.

14 Claims, 3 Drawing Sheets

DIGITAL TWIN AND A METHOD FOR MODELLING CONNECTIVITY OF A HEAVY-DUTY VEHICLE

TECHNICAL FIELD

The present disclosure relates generally to a digital twin and a method performed by the digital twin. More particularly the present disclosure relates to modelling connectivity of a heavy-duty vehicle.

The invention can be applied in heavy-duty vehicles, such as trucks, buses, and construction equipment. Although the invention will be described with respect to a heavy-duty vehicle, the invention is not restricted to this particular vehicle, but may also be used in other vehicles such as trailers, wheel loaders, articulated haulers, excavators, backhoe loaders, passenger cars, marine vessels, working machines, etc. The term vehicle will be used herein when referring to any of the above types of vehicles.

BACKGROUND

Most of today's vehicles have some type of network connectivity and there will probably be an increase in the need for connectivity in future for vehicles. The vehicle may use network connectivity technologies such as for example, Wi-Fi, satellite connectivity, mobile or cellular connectivity etc. The vehicle's connectivity is important and affects several aspects of the vehicle, such as user experience, safety, the user's operation of the vehicle, vehicle monitoring, etc. Since the vehicle's connectivity is important, it is important that it functions as optimal and correct as possible. There may be scenarios where for example a loss of satellite connectivity may influence the navigation system in the vehicle such that the user experiences problems in knowing where to drive to get to the destination, a loss of mobile connectivity may influence the functioning of emergency calls etc. Therefore, it would be an advantage if these scenarios may be identified before they occur such that the necessary measures may be taken.

Therefore, there is a need to at least mitigate or solve these issues.

SUMMARY

An object of the invention is to enable improved connectivity of a heavy-duty vehicle.

According to a first aspect of the invention, the is performed by a digital twin and is for modelling connectivity of a heavy-duty vehicle. The digital twin comprises a digital model of the heavy-duty vehicle. The digital twin is configured to access another digital model of one or more communication networks in which the heavy-duty vehicle is expected to operate. The digital win models an expected degree of connectivity of the heavy-duty vehicle to at least one of the one or more communication networks. The modelling is in dependence of at least one of: a vehicle state and vehicle connectivity system(s) onboard the heavy-duty vehicle. By the provision of the method which comprises, the advantage of obtaining a model of the expected degree of connectivity of the heavy-duty vehicle is provided. With the modelling of the expected degree of connectivity, potential issues with the connectivity may be identified and possibly also reduced and/or mitigated before they occur.

According to one embodiment, the vehicle state may comprise a vehicle geographical position. An improvement in that the modelled expected degree of connectivity takes the geographical position of the vehicle into account may be that the expected degree of connectivity is tailored for the vehicle's geographical position, i.e. the expected degree of connectivity may be more accurately modelled.

According to a further embodiment, the digital twin may predict which application(s) out of a configured set of applications comprised in the heavy-duty vehicle that are enabled given the expected degree of connectivity. An advantage of this may be more accurate information of the vehicle's connectivity may be provided which may enable the user to initiate the necessary actions. With the knowledge of which applications that are enabled, it may be possible to obtain information indication which applications that are disabled.

For example, in case that applications having a certain priority or degree of vehicle criticality are disabled, it may be possible to take necessary measures, e.g. improve the connectivity, change the vehicle's driving route such that it would not be in the area where these applications are disabled etc.

According to a further embodiment, the digital twin may determine that the expected degree of connectivity is below an acceptance criterion. The digital twin may determine that one or more applications comprised in the heavy-duty vehicle are at least partly out-of-service due to the connectivity being below the acceptance criterion. The digital twin may trigger a warning message when it has been determined that one or more applications comprised in the heavy-duty vehicle are at least partly out-of-service due to the connectivity being below the acceptance threshold. Hereby an improvement in that necessary measures may be taken when the warning message has been triggered. Another advantage may be that vehicle safety may be increased.

According to a further embodiment, the digital twin may estimate a vehicle position based on performed dead reckoning and/or transportation mission route data. The digital twin may determine that the expected degree of connectivity at the estimated vehicle position is below an acceptance criterion. The digital twin may determine, based on the estimated vehicle position, when the degree of connectivity of the heavy-duty vehicle is expected to be at or above the acceptance criterion. Dead reckoning may be used to estimate the vehicle position when the heavy-duty vehicle is at a position where the connectivity is below an acceptance criterion, e.g. in a mine, when something is blocking the signals from antenna etc., If the heavy-duty vehicle has a connectivity that is below an acceptance criterion, e.g. that the connectivity is reduced or it lost, for example when vehicle is in a mine, then the vehicle position estimated using dead reckoning and/or transportation mission route data may enable the digital twin to determine when the connectivity will be at or above the acceptance criterion, e.g. that the connectivity is restored. Depending on the amount of time until the degree of connectivity is expected to be at or above the acceptance criterion, an appropriate measure may be taken.

According to a further embodiment, the heavy-duty vehicle may comprise two or more vehicle connectivity systems. The digital twin may model the expected degree of connectivity of the heavy-duty vehicle using the two or more connectivity systems in combination. An advantage of this may be that increased connectivity for the heavy-duty vehicle may be obtained.

According to a further embodiment, the digital twin may determine that the expected degree of connectivity is below an acceptance criterion. When the expected degree of connectivity is determined to be below the acceptance criterion, the digital twin may evaluate if the expected degree of connectivity would be changed if the heavy-duty vehicle is configured with one or more vehicle connectivity systems from a catalogue of vehicle connectivity systems instead of or in addition to the vehicle connectivity system currently comprised in the heavy-duty vehicle. An advantage of this embodiment may be that the degree of connectivity of the heavy-duty vehicle may be changed, e.g. improved.

According to a further embodiment, the digital twin may evaluate if the expected degree of connectivity would be changed if the heavy-duty vehicle is configured with one or more alternative vehicle antenna systems from a catalogue of alternative vehicle antenna systems instead of or in addition to a current vehicle antenna system currently comprised in the heavy-duty vehicle. An advantage of this may be that the antenna coverage of the heavy-duty vehicle may be changed, e.g. improved.

According to a further embodiment, the digital twin may obtain connectivity data from the other digital model of one or more communication networks. An advantage of this may be that the modelling of the expected degree of connectivity may be based on more data than with data from only one of the communication networks. Thus, the accuracy of the modelling may be increased.

According to a further embodiment, the expected degree of connectivity may be a current expected degree of connectivity. The vehicle state may be a current vehicle state and the vehicle connectivity system(s) may be current vehicle connectivity system(s). The digital twin may model, given the current vehicle state and current vehicle connectivity system(s), an amount of data that can be successfully transferred to and/or from at least one of the one or more communication networks in an amount of time and with the current expected degree of connectivity. An advantage of this may be that it may be ensured if the one or more communication networks are currently sufficient to be able to successfully transfer the amount of data, if additional or other communication networks are necessary to successfully transfer the amount of data, etc.

According to a further embodiment, the expected degree of connectivity may be a future expected degree of connectivity. The vehicle state may be a future vehicle state and the vehicle connectivity system(s) may be future vehicle connectivity system(s). The digital twin may estimate a future point in time when an amount of data can be successfully transferred to and/or from at least one of the one or more communication networks in a given amount of time, the future vehicle state and the future vehicle connectivity system(s) and with the future expected degree of connectivity. An advantage of this may be that it may be ensured if the one or more communication networks will be sufficient to be able to successfully transfer the amount of data in the future, if additional or other communication networks will be necessary in the future to successfully transfer the amount of data, etc.

According to a further embodiment, the connectivity of the heavy-duty vehicle may be associated with at least one of: bandwidth, latency, and spectral efficiency.

According to a second aspect of the invention, the digital twin is for modelling connectivity of a heavy-duty vehicle. The digital twin is arranged to perform the method of the first aspect. Advantages and effects of the digital twin are largely analogous to the advantages and effects of the method. Further, all embodiments of the method are applicable to and combinable with all embodiments of the digital twin, and vice versa.

According to a third aspect of the invention, the heavy-duty vehicle comprises the digital twin of the second aspect.

According to a fourth aspect of the invention, the computer program comprises program code means for performing the steps of the method of the first aspect when said program is run on a computer.

According to a fifth aspect of the invention, the computer readable medium carries a computer program comprising program code means for performing the method of the first aspect when said program product is run on a computer.

Further advantages and advantageous features of the invention are disclosed in the following description and in the dependent claims. A person skilled in the art will recognize additional features and advantages upon reading the following detailed description.

BRIEF DESCRIPTION OF THE DRAWINGS

With reference to the appended drawings, below follows a more detailed description of embodiments of the invention cited as examples.

In the drawings.

The drawings are not necessarily to scale and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

Figure 1:
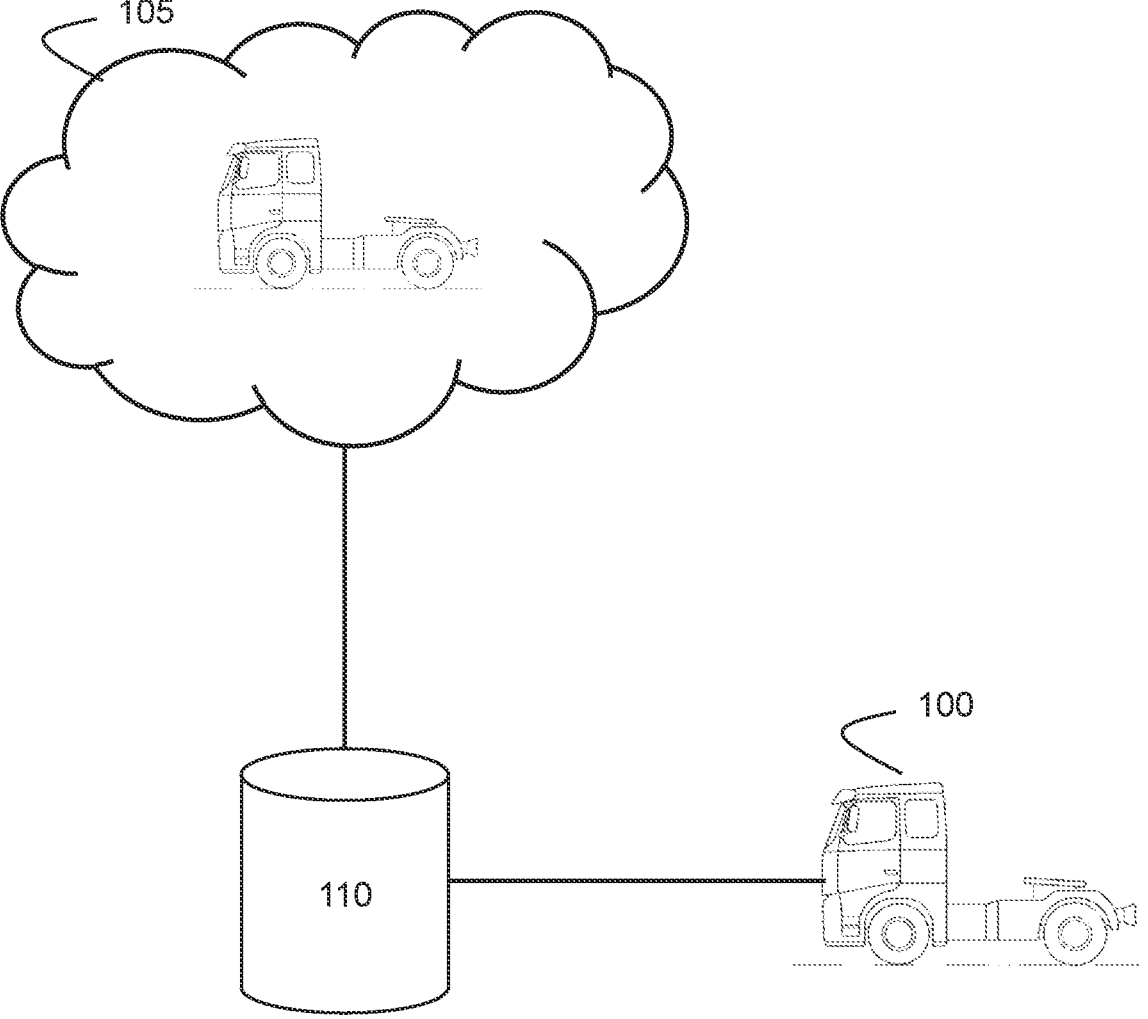
FIG. 1 is a schematic drawing illustrating a connectivity of a heavy-duty vehicle.

FIG. 1 is a schematic drawing illustrating a vehicle 100. The vehicle 100 may be a heavy-duty vehicle such as for example a truck, buss, construction equipment. The vehicle 100 may also be other vehicles such as trailers, wheel loaders, articulated haulers, excavators, backhoe loaders, passenger cars, marine vessels, working machines, etc. For the sake of simplicity, the term vehicle will be used herein when referring to any of the above examples of vehicles.

The vehicle 100 is arranged to connect to and access one or more communication networks. The communication network may be referred to as a communication system, connectivity environment, connectivity network, access network. The one or more communication networks may be based on one or more communication technologies, e.g. Wi-Fi, cellular communication, satellite communication etc. Each communication network may be geographically limited to a geographical area, e.g. a coverage area within which the communication network may provide communication services to for example the vehicle 100. When the vehicle 100 drives and changes geographical locations along the road, the vehicle 100 may connect to different communication networks as it enters coverage areas of different communication networks.

To be able to connect to and access the one or more communication networks, the vehicle 100 comprises one or more vehicle connectivity system(s). The vehicle connectivity system(s) are adapted to connect to the one or more communication networks. The vehicle connectivity system(s) may comprise for example a satellite antenna, a Wi-Fi antenna, a cellular communication antenna, etc.

FIG. 1 illustrates a digital twin 105. The digital twin 105 may be described as a digital representation or a digital model the vehicle 100. The term virtual representation and virtual model may also be used for the digital twin 105. The digital twin 105 is a digital representation of all components of the vehicle 100. The digital twin 105 mirrors the reality, i.e. the real vehicle 100.

The digital twin 105 may be comprised in the vehicle 100 or, in a computer system or in a cloud solution. The digital twin 105 may be a software in a fix location or as a set of distributed software packages that are interaction to the overall analysis performance, fix location or moving based on usage and other performance factors. The digital twin 105 may be completely comprised in the vehicle 100 or it may be completely comprised in another unit, e.g. a computer unit remotely located from the vehicle 100. The digital twin 105 may be distributed such that a first part of the digital twin 105 is located at a first location, e.g. comprised in the vehicle 100, and a second part of the digital twin 105 is located at a second location, e.g. comprised in a remote computer unit.

The digital twin 105 is arranged to obtain real-time and real-world operational data of the vehicle 100, e.g. real-time operational data, such that when a change occurs of the vehicle 100 in the real world, then the digital twin 105 is up to date with these changes.

The digital twin 105 and the vehicle 100 are therefore arranged to be connected to each other, via a wired communication link or a wired communication link or a partly wired and partly wireless communication link. The digital twin 105 is arranged to dynamically change in accordance with real-world changes of the vehicle 105. This is different from general computer simulations which are not based on real-time data. Based on the operational data of the vehicle 100, the digital twin 105 may be arranged to model or predict operation of the vehicle 100, for example to model expected fuel consumption for a given scenario, predict a maintenance need etc. The digital twin 105 simulates what is actually happening to an actual vehicle 100 in the real world, which is different to a simulation which simulates what could happen to a vehicle. The digital twin 105 is configured to display the result of its modelling for example on a display of a tablet computer, a mobile phone, a stationary computer etc.

The digital twin 105 may be implemented on and run on a computer unit 110. The computer unit 110 may comprise for example a processor, a memory storage, a communication interface etc. The computer unit 110 may comprise hardware and software. The computer unit 110 is arranged to enable data transfer between the vehicle 100 and the digital twin 105. The computer unit 110 may be arranged to store data from the vehicle 100 and the digital twin 105, e.g. in a local memory unit comprised in the computer unit 110, in a central memory unit, in a cloud memory unit etc. The computer unit 110 and the vehicle 100 may be located at the same location or in different locations.

The computer unit 110 and the vehicle 100 may be located at the same location or in different locations. A first part of the computer unit 110 may be comprised in the vehicle 100 and a second part of the computer unit 110 may be comprised in another unit remotely located from the vehicle 100, i.e. the computer unit 110 may be a distributed computer unit. The computer unit 110 may be a remote server or comprised in a remote server which is remotely located with respect to the vehicle 100. The computer unit 110 may be partly or completely comprised in the vehicle 100.

As mentioned above, the vehicle 100 is arranged to connect to and access one or more communication networks. In addition to the digital model of the vehicle 100, the digital twin 105 is configured to access another digital model of the one or more communication networks in which the heavy-duty vehicle 100 is expected to operate. With the access to the other digital model, the digital twin is configured to model the vehicle 100 in a greater context, i.e. the vehicle 100 in the one or more communication network(s) in which it is expected to operate. Thus, there may be one digital twin for the vehicle 100 and another digital twin for the one or more communication networks. Together, these digital models or digital twins may be described as a digital twin system comprising the digital model of the vehicle 100 and the digital model of the one or more communication networks.

Figure 2:
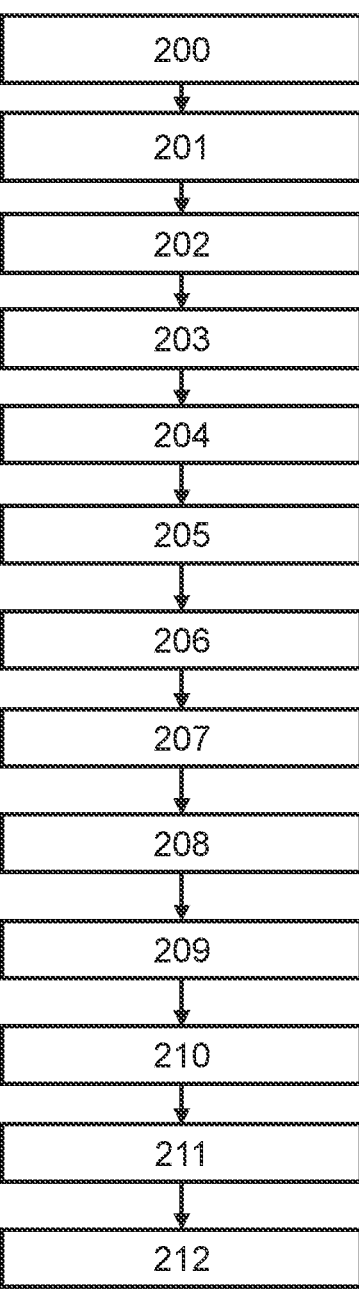
FIG. 2 is a flow chart illustrating a method.

FIG. 2 is a flow chart illustrating a method for modelling connectivity of a heavy-duty vehicle 100. The method is performed by the digital twin 105. As mentioned earlier, the digital twin 105 comprises a digital model of the heavy-duty vehicle 100. The digital twin 105 is configured to access or interface another digital model of one or more communication networks in which the heavy-duty vehicle 100 is expected to operate, e.g. by sending queries to the other digital model etc. The method comprises at least one of the following steps, which steps may be performed in any suitable order than described below:

Step 200

The digital twin 105 may obtain configuration data from another digital twin or a second digital twin. The other or second digital twin may be adapted to configure the digital twin 105. The digital twin 105 may be configured, based on the obtained configuration data.

The other digital twin may be any other suitable digital twin which is adapted to configure the digital twin 105, it may be the digital twin of the one or more communications network etc. Thus, an external digital twin may configure the digital twin 105, e.g. by passing configuration data to setup the digital twin 105.

The digital twin 105 may be obtain connectivity data from the digital models of the one or more communication network(s).

Step 201

The digital twin 105 models an expected degree of connectivity of the heavy-duty vehicle 100 to at least one of the one or more communication networks. The modelling is in dependence of at least one or both of:

a vehicle state, and vehicle connectivity system(s) onboard the heavy-duty vehicle 100.

The vehicle state may be obtained from the vehicle 100. The vehicle state may be a real-time vehicle state, i.e. a current vehicle state.

The vehicle state may comprise a vehicle geographical position, e.g. a current geographical position of the vehicle. The vehicle state may comprise data indicating if the vehicle 100 is unloading or loading. The vehicle state may comprise data indicating if the vehicle 100 has entered an area, such as an underground mine or the like, where the communication network cannot reach.

The degree of connectivity may be measured in percentage where 100% is full connectivity and 0% is no connectivity. The degree of connectivity may be in relation to an acceptance criterion, for example below the acceptance criterion, at the acceptance criterion or above the acceptance criterion. The acceptance criterion may be predetermined, it may be fixed, or it may be changed dynamically.

The degree of connectivity may be described as a capacity feature of the one or more communication network. The degree of connectivity may be associated with at least one of the following parameters related to the communication link between the vehicle 100 and the one or more communication network:

bandwidth, and/or latency, and/or spectral efficiency.

The bandwidth indicates the maximum capacity of the communication link to transmit data in a given amount of time and is measured in bits per second. Latency indicates a time delay, i.e. the amount of time it takes for the data to be transmitted from the sender to the receiver. Latency is measured in milliseconds. Spectral efficiency indicates the amount of data to transmit over the communication link given a certain bandwidth and given the circumstances. The spectral efficiency is measured in bits/sec/Hz.

The heavy-duty vehicle 100 may comprise two or more vehicle connectivity systems, and the expected degree of connectivity of the heavy-duty vehicle 100 may be modelled using the two or more connectivity systems in combination.

The expected degree of connectivity of the heavy-duty vehicle 100 may be modelled using the obtained connectivity data from step 200.

Step 202

The digital twin 105 may predict which application(s) out of a configured set of applications comprised in the vehicle 100 that are enabled given the expected degree of connectivity. The applications may be for example a navigation application, a satellite communication application, cellular communication application, a Wi-Fi communication application etc. For example, satellite communication may be enabled when the given expected degree of connectivity is below a threshold and 5G mobile communication may be enabled when the given expected degree of connectivity is at or above the threshold.

Step 203

The digital twin 105 may determine that the expected degree of connectivity is below an acceptance criterion. The acceptance criterion may be predetermined, it may be fixed, it may be dynamically changed etc. the acceptance criterion may be determined by the digital twin 105, it may be provided to the digital twin 105 from for example a user of the vehicle, a user of the digital twin 105, a central computer etc.

Step 204

The digital twin 105 may determine that one or more applications comprised in the heavy-duty vehicle 100 are at least partly out-of-service due to the connectivity being below the acceptance criterion. When an application is at least partly out-of-service it may comprise that the application does not function in an optimal or necessary fashion, with sufficient amount of quality etc.

Step 205

The digital twin 105 may trigger a warning message when it has been determined that one or more applications comprised in the heavy-duty vehicle 100 are at least partly out-of-service due to the connectivity being below the acceptance threshold. The warning message may be for example a sound alarm, a visual warning message displayed on a display, a tactile warning message such as a vibration in a user equipment etc.

Step 206

The digital twin 105 may estimate a vehicle position based on performed dead reckoning and/or transportation mission route data. The vehicle position may be a geographical vehicle position. Dead reckoning is a method for determining the current position of the vehicle 100 by using a previously known position. When the vehicle 100 has sufficient connectivity to the communication network, then the communication network may be used to determine the vehicle position. However, if the vehicle 100 is at a location where there are no or limited connections to communication networks, e.g. in a mine, then the current vehicle position may still be determined by using dead reckoning.

Transportation mission route data may be data indicating the route that the vehicle 100 is intended to follow to complete a transportation mission. The transportation mission route data may be predetermined, it may be dynamically provided to the digital twin 105, it may be fixed, or it may dynamically change when the vehicle 100 is following the route.

Step 207

The digital twin 105 may determine that the expected degree of connectivity at the estimated vehicle position is below an acceptance criterion. The acceptance criterion may be associated with a degree of connectivity that is acceptable, a degree of connectivity which has sufficient quality etc.

Step 208

The digital twin 105 may determine, based on the estimated vehicle position, when the degree of connectivity of the heavy-duty vehicle 100 is expected to be at or above the acceptance criterion. This way, the digital twin 105 may estimate for example when the connectivity may be restored again after the vehicle 100 has exited the mine.

Step 209

After the expected degree of connectivity is determined to be below the acceptance criterion in step 203, the digital twin 105 may evaluate if the expected degree of connectivity would be changed if the heavy-duty vehicle 100 is configured with one or more alternative vehicle connectivity systems from a catalogue of alternative vehicle connectivity systems instead of or in addition to the vehicle connectivity system currently comprised in the heavy-duty vehicle 100. The change of degree of connectivity may be an increased degree of connectivity, a decreased degree of connectivity or there may be no change of connectivity, as compared to the current degree of connectivity. This way, it may be possible to determine if it is of any value to configure the vehicle 100 with other or additional vehicle connectivity systems or not.

In step 201, the digital twin performs modelling of the models the vehicle connectivity systems which is currently on board the vehicle 100. In step 209, the digital twin 105 may model one or more other vehicle connectivity systems which may possibly be provided onboard the vehicle 100. Suppose for instance that the vehicle 100 is currently provided with a 4G system, which the modelling in step 201 is based on. Then the digital twin 105 in step 290 may also models the expected degree of connectivity if the vehicle 100 comprises a 5G system or a satellite link in addition or in place of the 4G system.

Assuming that the expected degree of connectivity based on the current vehicle connectivity system which was modelled in step 201 is a first expected degree of connectivity. In step 209, a second degree of connectivity may be modelled which is the expected degree of connectivity modelled based on the alternative vehicle connectivity system. Then the first expected degree of connectivity and the second degree of connectivity may be compared to determine if the result of the comparing indicates any change in the connectivity.

Step 210

After the expected degree of connectivity is determined to be below the acceptance criterion in step 203, the digital twin 105 may evaluate if the expected degree of connectivity would be changed if the heavy-duty vehicle 100 is configured with one or more alternative vehicle antenna systems from a catalogue of alternative vehicle antenna systems instead of or in addition to a current vehicle antenna system currently comprised in the heavy-duty vehicle 100. The change of degree of connectivity may be an increased degree of connectivity, a decreased degree of connectivity or there may be no change of connectivity, as compared to the current degree of connectivity. This way, it may be possible to determine if it is of any value to configure the vehicle 100 with other or additional vehicle antenna systems or not.

Assuming that the expected degree of connectivity based on the current vehicle antenna system which was modelled in step 201 is a first expected degree of connectivity. In step 210, a second degree of connectivity may be modelled which is the expected degree of connectivity modelled based on the alternative vehicle antenna system. Then the first expected degree of connectivity and the second degree of connectivity may be compared to determine if the result of the comparing indicates any change in the connectivity.

For example, the vehicle 100 may currently have a standard isotropic antenna onboard. An alternative vehicle antenna system may be an advanced antenna array or a high gain system, or any other vehicle antenna system that for example may improve to resolve for example outage.

Step 211

The expected degree of connectivity may a current expected degree of connectivity, the vehicle state may be a current vehicle state and the vehicle connectivity system(s) may be current vehicle connectivity system(s). The digital twin 105 may model, given the current vehicle state and current vehicle connectivity system(s), an amount of data that can be successfully transferred to and/or from at least one of the one or more communication networks in an amount of time and with the current expected degree of connectivity.

Step 212

Figure 3A:
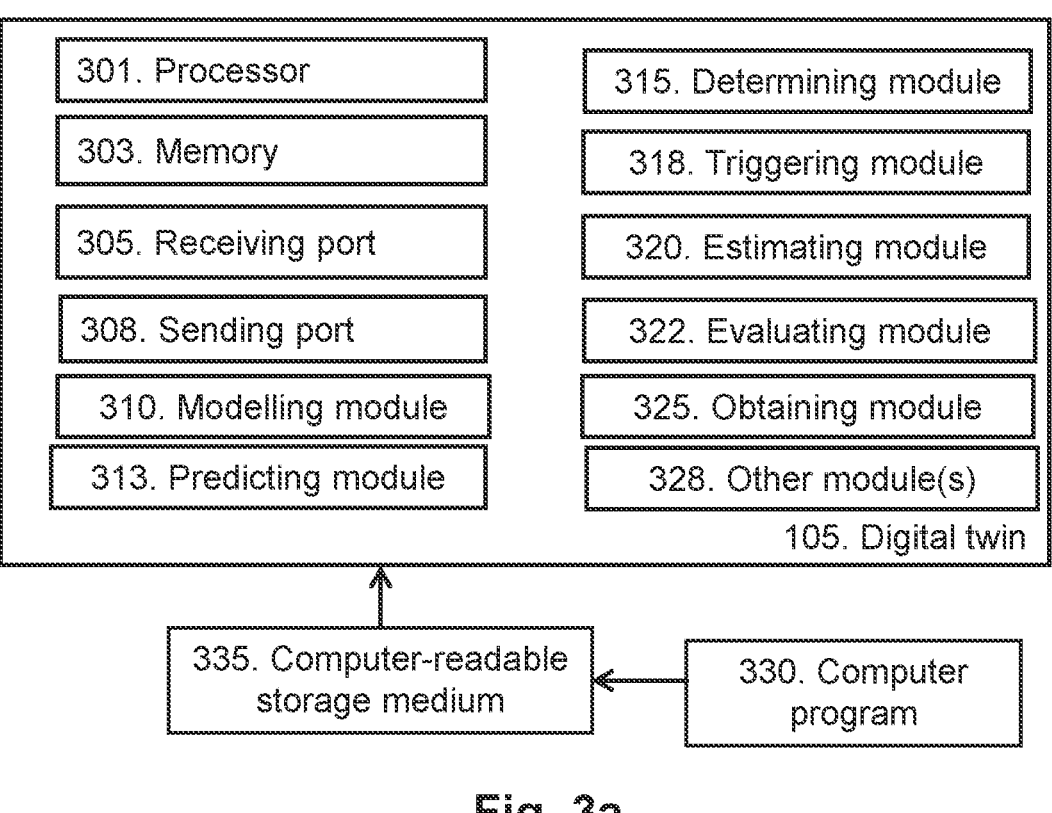
FIG. 3a is a schematic drawing illustrating a digital twin.
Figure 3B:
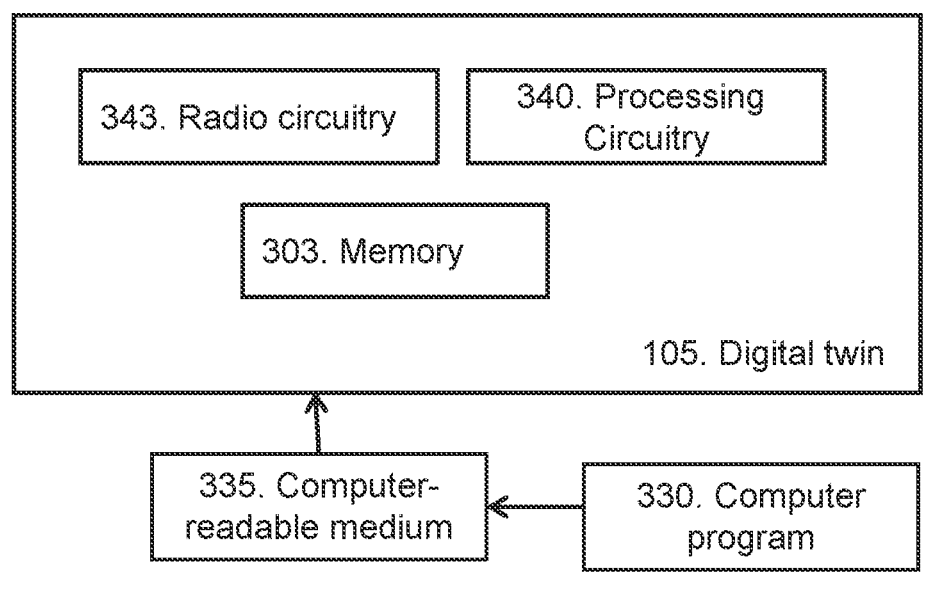
FIG. 3b is a schematic drawing illustrating a digital twin.

The expected degree of connectivity may be a future expected degree of connectivity, the vehicle state may be a future vehicle state and the vehicle connectivity system(s) may be future vehicle connectivity system(s). The digital twin 105 may estimate a future point in time when an amount of data can be successfully transferred to and/or from at least one of the one or more communication networks in a given amount of time, and the future vehicle state and the future vehicle connectivity system(s) and with the future expected degree of connectivity The digital twin 105 for modelling connectivity of a heavy-duty vehicle 100 is arranged to perform the method described herein. The digital twin 105 comprises a digital model of the heavy-duty vehicle 100. The digital twin 105 is configured to access another digital model of one or more communication networks in which the heavy-duty vehicle 100 is expected to operate. To perform the method steps shown in FIG. 2 the digital twin 105 may comprise an arrangement as shown in one or both of FIG. 3a and/or FIG. 3b. FIG. 3a and FIG. 3b depict two different examples of the arrangement that the digital twin 103 may comprise.

The present disclosure related to the digital twin 105 may be implemented through one or more processors, such as a processor 301 depicted in FIG. 3a, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the digital twin 105. One such carrier may be in the form of a CD ROM disc. It is however feasible with other data carriers such as a memory stick. The computer program code may be provided as pure program code on a server and downloaded to the digital twin 105.

The digital twin 105 may comprise a memory 303 comprising one or more memory units. The memory 303 is arranged to be used to store obtained information, store data, configurations, schedulings, and applications etc. to perform the methods herein when being executed in the digital twin 105.

The digital twin 105 may receive information and/or data from, e.g. the vehicle 100, vehicle connectivity systems, vehicle antenna systems, another digital twin(s), a central computer, through a receiving port 305. The receiving port 305 may be, for example, connected to one or more antennas in digital twin 105. The digital twin 105 may receive information from another structure in the system through the receiving port 305. Since the receiving port 305 may be in communication with the processor 301, the receiving port 305 may then send the received information to the processor 301. The receiving port 305 may also be configured to receive other information.

The processor 301 in the digital twin 105 may be configured to transmit or send information to e.g. the vehicle 100, another vehicle, vehicle connectivity systems, vehicle antenna systems, another digital twin(s), a central computer or another structure in the system, through a sending port 308, which may be in communication with the processor 301, and the memory 303.

The digital twin 105 may comprise a modelling module 310, a predicting module 313, a determining module 315, a triggering module 318, an estimating module 320, an evaluating module 322, an obtaining module 325, other module(s) 328 etc.

The digital twin 105 is arranged to, e.g. by means of the modelling module 310, model an expected degree of connectivity of the heavy-duty vehicle 100 to at least one of the one or more communication networks. The modelling is in dependence of at least one of: a vehicle state and vehicle connectivity system(s) onboard the heavy-duty vehicle 100. The vehicle state may comprise a vehicle geographical position. The heavy-duty vehicle 100 may comprise two or more vehicle connectivity systems, and the expected degree of connectivity of the heavy-duty vehicle 100 may be modelled using the two or more connectivity systems in combination. The expected degree of connectivity may be a current expected degree of connectivity. The vehicle state may be a current vehicle state and the vehicle connectivity system(s) may be current vehicle connectivity system(s). The expected degree of connectivity may be a future expected degree of connectivity. The vehicle state may be a future vehicle state and the vehicle connectivity system(s) are future vehicle connectivity system(s), The connectivity of the heavy-duty vehicle 100 may be associated with at least one of: bandwidth, latency and spectral efficiency. The modelling module 310 may also be referred to as a modelling unit, a modelling means, a modelling circuit, means for modelling etc. The modelling module 310 may be a processor 301 of the digital twin 105 or comprised in the processor 301 of the digital twin 105.

The digital twin 105 may be arranged to, e.g. by means of the predicting module 313, predict which application(s) out of a configured set of applications comprised in the heavy-duty vehicle 100 that are enabled given the expected degree of connectivity. The predicting module 313 may also be referred to as a predicting unit, a predicting means, a predicting circuit, means for predicting etc. The predicting module 313 may be a processor 301 of the digital twin 105 or comprised in the processor 301 of the digital twin 105.

The digital twin 105 may be arranged to, e.g. by means of the determining module 315, determine that the expected degree of connectivity is below an acceptance criterion. The determining module 315 may also be referred to as a determining unit, a determining means, a determining circuit, means for determining etc. The determining module 315 may be a processor 301 of the digital twin 105 or comprised in the processor 301 of the digital twin 105.

The digital twin 105 may be arranged to, e.g. by means of the determining module 315, determine that one or more applications comprised in the heavy-duty vehicle 100 are at least partly out-of-service due to the connectivity being below the acceptance criterion.

The digital twin 105 may be arranged to, e.g. by means of the triggering module 318, trigger a warning message when it has been determined that one or more applications comprised in the heavy-duty vehicle 100 are at least partly out-of-service due to the connectivity being below the acceptance threshold. The triggering module 318 may also be referred to as a triggering unit, a triggering means, a triggering circuit, means for triggering etc. The triggering module 318 may be a processor 301 of the digital twin 105 or comprised in the processor 301 of the digital twin 105.

The digital twin 105 may be arranged to, e.g. by means of the estimating module 320, estimate a vehicle position based on performed dead reckoning and/or transportation mission route data. The estimating module 320 may also be referred to as an estimating unit, an estimating means, an estimating circuit, means for estimating etc. The estimating module 320 may be a processor 301 of the digital twin 105 or comprised in the processor 301 of the digital twin 105.

The digital twin 105 may be arranged to, e.g. by means of the determining module 315, determine that the expected degree of connectivity at the estimated vehicle position is below an acceptance criterion.

The digital twin 105 may be arranged to, e.g. by means of the determining module 315, determine, based on the estimated vehicle position, when the degree of connectivity of the heavy-duty vehicle 100 is expected to be at or above the acceptance criterion.

The digital twin 105 may be arranged to, e.g. by means of the determining module 315, determine that the expected degree of connectivity is below an acceptance criterion.

The digital twin 105 may be arranged to, e.g. by means of the evaluating module 322, when the expected degree of connectivity is determined to be below the acceptance criterion, evaluate if the expected degree of connectivity would be changed if the heavy-duty vehicle 100 is configured with one or more alternative vehicle connectivity systems from a catalogue of alternative vehicle connectivity systems instead of or in addition to the vehicle connectivity system currently comprised in the heavy-duty vehicle 100. The evaluating module 322 may also be referred to as an evaluating unit, an evaluating means, an evaluating circuit, means for evaluating etc. The evaluating module 322 may be a processor 301 of the digital twin 105 or comprised in the processor 301 of the digital twin 105.

The digital twin 105 may be arranged to, e.g. by means of the evaluating module 322, evaluate if the expected degree of connectivity would be changed if the heavy-duty vehicle 100 is configured with one or more alternative vehicle antenna systems from a catalogue of alternative vehicle antenna systems instead of or in addition to a current vehicle antenna system currently comprised in the heavy-duty vehicle 100.

The digital twin 105 may be arranged to, e.g. by means of the obtaining module 325, obtain configuration data from another digital twin. The obtaining module 325 may also be referred to as an obtaining unit, an obtaining means, an obtaining circuit, means for obtaining etc. The obtaining module 325 may be a processor 301 of the digital twin 105 or comprised in the processor 301 of the digital twin 105.

The digital twin 105 may be arranged to, e.g. by means of the modelling module 310, model, given the current vehicle state and current vehicle connectivity system(s), an amount of data that can be successfully transferred to and/or from at least one of the one or more communication networks in an amount of time and with the current expected degree of connectivity.

The digital twin 105 may be arranged to, e.g. by means of the estimating module 320, estimate a future point in time when an amount of data can be successfully transferred to and/or from at least one of the one or more communication networks in a given amount of time, and the future vehicle state and the future vehicle connectivity system(s) and with the future expected degree of connectivity.

Those skilled in the art will also appreciate that the modelling module 310, a predicting module 313, a determining module 315, a triggering module 318, an estimating module 320, an evaluating module 322, an obtaining module 325, other module(s) 328 etc. described above may refer to a combination of analogue and digital circuits, and/or one or more processors configured with software and/or firmware, e.g., stored in memory, that, when executed by the one or more processors such as the processor 301, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

The different units 310-328 described above may be implemented as one or more applications running on one or more processors such as the processor 301.

Thus, the methods described herein for the digital twin 105 may be respectively implemented by means of a computer program 330 product, comprising instructions, i.e., software code portions, which, when executed on at least one processor 301, cause the at least one processor 301 to carry out the actions described herein, as performed by the digital twin 105. The computer program 330 product may be stored on a computer-readable storage medium 335. The computer-readable storage medium 335, having stored thereon the computer program 330, may comprise instructions which, when executed on at least one processor 301, cause the at least one processor 301 to carry out the actions described herein, as performed by the digital twin 105. The computer-readable storage medium 335 may be a non-transitory computer-readable storage medium, such as a CD ROM disc, or a memory stick. The computer program 330 product may be stored on a carrier containing the computer program 330 just described, wherein the carrier is one of an electronic signal, optical signal, radio signal, or the first computer-readable storage medium 335, as described above.

The digital twin 105 may comprise a communication interface configured to facilitate communications between the digital twin 105 and other units, systems or devices, e.g., the vehicle 100, another vehicle, vehicle connectivity systems, vehicle antenna systems, another digital twin(s), a central computer or another structure. The interface may comprise a transceiver configured to transmit and receive radio signals over an air interface in accordance with a suitable standard.

The digital twin 105 may comprise the following arrangement depicted in FIG. 3b. The digital twin 105 may comprise a processing circuitry 340, e.g., one or more processors such as the processor 301, in the digital twin 105 and the memory 303. The digital twin 105 may also comprise a radio circuitry 343, which may comprise e.g., the receiving port 305 and the sending port 305. The processing circuitry 340 may be configured to, or operable to, perform the method actions according to FIG. 2, in a similar manner as that described in relation to FIG. 3a. The radio circuitry 343 may be configured to set up and maintain at least a wireless connection with the digital twin 105. Circuitry may be understood herein as a hardware component.

The heavy-duty vehicle 100 may comprise the digital twin 105 described herein.

Hence, the present disclosure also relates to the digital twin 105 arranged to modelling connectivity of a heavy-duty vehicle 100. The digital twin 105 may comprise the processing circuitry 340 and the memory 303. The memory 303 comprises instructions executable by the processing circuitry 340. The digital twin 105 is operative to perform the actions described herein in relation to the digital twin 105, e.g., in FIG. 2.

The method described herein for modelling connectivity of a heavy-duty vehicle 100 may be implemented through one or more processors, e.g. comprised in the computer unit 110, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein. One such carrier may be in the form of a CD ROM disc. It is however feasible with other data carriers such as a memory stick. The computer program code can furthermore be provided as pure program code on a server and downloaded to the computer unit 110.

A computer program may comprise program code means for performing the steps of the method described herein when said program is run on a computer. A computer readable medium may carry a computer program comprising program code means for performing the method describe herein when said program product is run on a computer.

Summarized, the digital twin 105 is arranged to comprise a digital model of the vehicle 100 and also of the environment in which the vehicle 100 is operating, in particular the connectivity environment of the vehicle 100. The digital twin 105 is then able to accurately model a current degree of connectivity for a given vehicle state such as its position and types of on-board vehicle connectivity systems. The digital twin 105 may be arranged to predict an improvement obtained if one or more alternative vehicle connectivity systems would be enabled on the vehicle 100, such as for example a satellite communication system in case of poor coverage, or a more advanced on-board antenna system in case of poor signal strength etc.

As mentioned earlier, many future services for the vehicle 100 will require some degree of connectivity. Therefore, modelling the expected degree of connectivity of the vehicle 100 by using the digital twin 105 may be advantageous for example to identify potential issues before they occur.

Connectivity quality for critical features and/or services of the vehicle 100 may be provided or improved with the present invention.

The term "at least one of A and B" should be understood to mean "only A, only B, or both A and B.", where A and B are any parameter, number, indication used herein etc.

The term "adapted to" used herein may also be referred to as "arranged to", "configured to", "capable of" or "operative to".

It is to be understood that the present invention is not limited to the embodiments described herein and illustrated in the drawings; rather, the skilled person will recognize that many changes and modifications may be made within the scope of the appended claims.

The invention claimed is:

1. A method performed by a digital twin for modelling connectivity of a heavy-duty vehicle,
  wherein the digital twin comprises a digital model of the heavy-duty vehicle,
  wherein the digital twin is configured to access another digital model of one or more communication networks in which the heavy-duty vehicle is expected to operate;
  the method comprising:
    modelling an expected degree of connectivity of the heavy-duty vehicle to at least one of the one or more communication networks,
  wherein the modelling is in dependence of a vehicle state and vehicle connectivity system(s) onboard the heavy-duty vehicle;
    determining that the expected degree of connectivity is below an acceptance criterion;
    determining that one or more applications comprised in the heavy-duty vehicle are at least partly out-of-service due to the connectivity being below the acceptance criterion; and
    triggering a warning message that one or more applications comprised in the heavy-duty vehicle are at least partly out-of-service due to the connectivity being below the acceptance threshold.

2. The method according to claim 1, wherein the vehicle state comprises a vehicle geographical position.

3. The method according to claim 1, comprising:
  predicting which application(s) out of a configured set of applications comprised in the heavy-duty vehicle that are enabled given the expected degree of connectivity.

4. The method according to claim 1, comprising:
  estimating a vehicle position based on performed dead reckoning or transportation mission route data;
  determining that the expected degree of connectivity at the estimated vehicle position is below an acceptance criterion; and
  determining, based on the estimated vehicle position, when the degree of connectivity of the heavy-duty vehicle is expected to be at or above the acceptance criterion.

5. The method according to claim 1, wherein the heavy-duty vehicle comprises two or more vehicle connectivity systems, and wherein the expected degree of connectivity of the heavy-duty vehicle is modelled using the two or more connectivity systems in combination.

6. The method according to claim 1, comprising:
  evaluating if the expected degree of connectivity would be changed if the heavy-duty vehicle is configured with one or more alternative vehicle connectivity systems from a catalogue of alternative vehicle connectivity systems instead of or in addition to the vehicle connectivity system currently comprised in the heavy-duty vehicle.

7. The method according to claim 1, comprising:

evaluating if the expected degree of connectivity would be changed if the heavy-duty vehicle is configured with one or more alternative vehicle antenna systems from a catalogue of alternative vehicle antenna systems instead of or in addition to a current vehicle antenna system currently comprised in the heavy-duty vehicle.

8. The method according to claim 1, comprising:

obtaining configuration data from another digital twin.

9. The method according to claim 1, wherein the expected degree of connectivity is a current expected degree of connectivity, wherein the vehicle state is a current vehicle state and the vehicle connectivity system(s) are current vehicle connectivity system(s), and wherein the method comprises:

modelling, given the current vehicle state and current vehicle connectivity system(s), an amount of data that can be successfully transferred to or from at least one of the one or more communication networks in an amount of time and with the current expected degree of connectivity.

10. The method according to claim 1, wherein the expected degree of connectivity is a future expected degree of connectivity, wherein the vehicle state is a future vehicle state and the vehicle connectivity system(s) are future vehicle connectivity system(s), and wherein the method comprises:

estimating a future point in time when an amount of data can be successfully transferred to or from at least one of the one or more communication networks in a given amount of time, and the future vehicle state and the future vehicle connectivity system(s) and with the future expected degree of connectivity.

11. The method according to claim 1, wherein the connectivity of the heavy-duty vehicle is associated with at least one of: bandwidth, latency and spectral efficiency.

12. A digital twin for modelling connectivity of a heavy-duty vehicle, wherein the digital twin is arranged to perform the method according to claim 1.

13. A heavy-duty vehicle comprising the digital twin according to claim 12.

14. A computer readable medium carrying a non-transitory computer program comprising program code for performing the method of claim 1 when said program code is run on a computer.

\* \* \* \* \*